United States Patent Office 2,831,033
Patented Apr. 15, 1958

2,831,033
METHOD FOR ETHERIFYING POLYFLUORO-ALKANOLS

Jacques G. O'Rear, Prince Georges County, Md., assignor to the United States of America as represented by the Secretary of the Navy No Drawing. Application January 6, 1954
Serial No. 402,608

3 Claims. (Cl. 260—614)

(Granted under Title 35, U. S. Code (1952), sec. 266)

This invention relates to the preparation of aliphatic and aromatic ethers of a class of polyfluoroalkanols, more particularly to a wet method for alkylating and arylating said polyfluoroalkanols.

The polyfluoroalkanols to which the method of the present invention relates have the general formula:

$$H(CF_2)_n(CH_2)_xOH$$

wherein $n$ is an integer from 2 to 20 and $x$ is an integer from 1 to 3. These primary alcohols, as can be seen from the formula, contain a hydrogen atom on the omega carbon atom of the fluorohydrocarbon chain and a pair of fluorine atoms on a carbon atom which is adjacent to the carbinol (CH$_2$OH) group. They can be designated ω-hydroperfluoroalkylcarbinols and include, for example, ω-hydroperfluoroethylcarbinol, ω-hydroperfluorobutylcarbinol, ω-hydroperfluorohexylcarbinol, ω-hydroperfluorooctylcarbinol, ω-hydroperfluorodecylcarbinol, ω-hydroperfluorododecylcarbinol, etc. Other polyfluoroalkanols coming within the above general formula are, for example, octafluorohexanol-1 of the formula, $$H(CF_2)_4CH_2CH_2OH$$

and tetrafluoropentanol-1 of the formula, $$H(CF_2)_2CH_2CH_2CH_2OH$$

Procedures designed for alkylating or arylating alkanols which involve the presence or formation of an alkali metal alcoholate in the reaction are seriously hindered by the presence of water. Water, as is well known, causes hydrolysis of an alkali metal alcoholate with reformation of the alkanol. Success in the application of such procedures requires that they be carried out in the absence of water. The well known Williamson synthesis is typical of these procedures which are carried out successfully under anhydrous conditions.

I have found that the aforementioned polyfluoroalkanols can be alkylated and arylated in a wet way to give substantial yields of aliphatic and aromatic ethers by reacting the polyfluoroalcohol, aqueous alkali metal hydroxide, e. g., aqueous sodium or potassium hydroxide, and the corresponding p-toluene sulfonic acid ester in accordance with the following general equation:

$$[H(CF_2)_n(CH_2)_xOH]_m + [p\text{-}CH_3C_6H_4SO_3\text{—}]_mR \xrightarrow{aq.\ NaOH}$$
$$[H(CF_2)_n(CH_2)_x\text{—}O\text{—}]_mR + [p\text{-}CH_3C_6H_4SO_3Na]_m + mH_2O$$

wherein R is a hydrocarbon or halohydrocarbon radical, $m$ is the valence of R, and $n$ and $x$ are as above.

If in the above aqueous reaction an alkanol is used in place of the perfluoroalkanol, no appreciable yields of the ether will be obtained. The fact that the etherification will proceed in the case of the aforesaid polyfluoroalkanols to substantial yields of the ethers is due to the presence in the molecule of these fluorinated alcohols of a pair of fluorine atoms on a carbon atom which is vicinal to the carbinol group. These fluorine atoms by their inductive effect on the carbinol group render the hydroxylic hydrogen atom thereof much more acidic than the hydroxylic hydrogen atom of the carbinol group of the alkanols. Because of the greater acidity of the hydroxylic hydrogen atom of their carbinol group, the aforesaid polyfluoroalkanols are capable of forming alkali metal alcoholates which are more resistant to hydrolysis than those of the alkanols and, as I have found, are stable in aqueous suspension.

In the practice of the method of the invention, the polyfluoroalkanol is dispersed at ordinary temperatures in an aqueous solution of the equivalent quantity of the alkali metal hydroxide. The suspension thereby formed is stirred and heated under reflux for about an hour to form the fluoroalcoholate. The equivalent reacting quantity of the desired p-toluene sulfonic acid ester (p-tosylate ester) is added to the cooled suspension of the fluoroalcoholate and the resulting mixture stirred under reflux heating for a substantial period to form the ether. Formation of the ether is indicated by the presence of an oily emulsion in the aqueous reaction mixture which on cooling is resolved into a heavy organic layer. This organic layer is washed by shaking the reaction mixture with from dilute to strong caustic soda solution. The strength of this solution will depend upon the p-toluene sulfonic acid ester to be broken up, care being taken in the case of certain of the product ethers not to cause removal of the halogen, e. g., bromine, from the halohydrocarbon group of the ether by the use of too strong alkali solution, as will be understood by those skilled in the art. The treated layer containing the product ether is then taken up in a suitable volatile organic solvent therefor, for example, ethyl ether or mixtures thereof with benzene or toluene. Unreacted polyfluoroalkanol may also be taken up in the volatile organic solvent. The extract is washed with water until neutral and distilled under reduced pressure to obtain the product ether. Where the boiling point of the product is close to that of the starting polyfluoroalkanol, the product may be further purified by repeated close fractional distillations at low pressures. Distillation of the extract will generally furnish from about 40 to 70% yields of the ethers of the hereindefined polyfluoroalkanols. For the preparation of monoethers there can be used, for example, such p-tosylates as, p-toluene sulfonic acid methyl ester, -ethyl ester, -propyl ester, -t-butyl ester, -2-ethylhexyl ester, -dodecyl ester, -octadecyl ester, -oleyl ester, -allyl ester, -cyclohexyl ester, benzyl ester, 2-β-naphthylethyl ester, -phenyl ester, -β-naphthyl ester, -p-tolyl ester, p-2-xylyl ester, -4-diphenyl ester, -p-benzylphenyl ester, -3-chloropropyl ester, -7-chloroheptyl ester, -4-chloro-n-amyl ester, -4-bromo-n-amyl ester, -2,2,3-trichloro-n-butyl ester, -p-chlorophenyl ester, p-bromophenyl ester, -p-fluorophenyl ester, -p-iodophenyl ester, -3-chloro-4-diphenyl ester, etc., and for the preparation of the polyethers, p-toluene sulfonic acid polyesters derived from aliphatic and aromatic polyhydric alcohols, such as from ethylene glycol, propylene glycol, 2-chloro-1,3-propylene glycol, 2-bromo-1,3-propylene glycol, hexamethylene glycol, glycerol, pentaerythritol, resorcinol, di-tert-amyl resorcinol, 4-chlororesorcinol, 4-iodoresorcinol, 3,5,3',5'-tetramethyl-4,4'-dihydroxydiphenyl, 4-bromopyrogallol, dihydroxydiphenyl, p,p'-dihydroxystilbene, 2,7-dihydroxynaphthalene, etc.

The method of the invention is further illustrated by the following specific examples in which it is applied to the preparation of a mono- and a diether, respectively. Parts are by weight unless otherwise noted.

Example 1

A suspension was formed by stirring together in the cold, 53.14 parts (.16 mol) of ω-hydro-perfluorohexylcarbinol, 9.2 parts of sodium hydroxide and 250 ml. of water. 27.94 parts (.15 mol) of methyl-p-toluene sulfonate was gradually added to the suspension with stirring, the addition being made over a period of 30 minutes. The mixture was then stirred under reflux for 16 hours. After cooling, the oily layer which formed in the reaction mixture was washed therein by shaking with an amount of 6 normal aqueous sodium hydroxide solution sufficient to hydrolyze the unreacted p-tosylate ester. The treated oily layer was then taken up in 400 ml. of an equal volume mixture of ethyl ether and benzene. The extract distilled under reduced pressure gave a substantial yield of the mono ether, 1H,1H,7H-perfluoroheptoxymethane of the formula, $H(CF_2)_6CH_2—O—CH_3$, in dry condition. Repeated close fractional distillations of the product gives 40–50% yields of the mono ether. Purified in this way, the mono ether had a boiling point of 81–82° C. at 20 mm. and 118.5° C. at 203 mm., an index of refraction $N_D^{20}$ of 1.3614 and a density $D_4^{20}$ of 1.6323. The viscosity of the mono ether at 100° F. was 2.5 centistokes and that of the starting polyfluoroalcohol 8.04 centistokes.

*Example 2*

A mixture of 464.9 parts (1.4 mols) of ω-hydro-perfluorohexylcarbinol, 57.7 parts (1.4 mols) of sodium hydroxide and 300 ml. of water was first stirred in the cold and then for one hour under reflux. The resulting suspension was cooled and to it was gradually added under stirring, a total of 290 parts (.68 mol) of hexamethylene glycol-1,6-bis(p-toluene sulfonate) in 200 ml. of water. This mixture was stirred in the cold for an hour and then for 16 hours under reflux. On cooling, an oily layer formed at the bottom of the reaction mixture. The oily layer was shaken in the reaction mixture with 200 ml. of 6 normal aqueous sodium hydroxide and then extracted with repeated applications of ethyl ether. The extract was washed with water until neutral and then distilled under reduced pressure to remove the water. The product is the mixed diether, 1,6-bis(1H,1H,7H-perfluoroheptoxy) hexane of the formula, $$H(CF_2)_6CH_2—O—(CH_2)_6—O—CH_2(CF_2)_6H$$

and is obtained in yields of 40 to 70%. The mixed ether boils at 142° C./0.3 mm., has an index of refraction $N_D^{20}$ of 1.316 and a density $D_4^{20}$ of 1.5776.

When in the manner of Example 2 it was attempted to prepare the corresponding dialkyl ether of the unfluorinated alcohol, heptanol, which alkanol has the formula, $CH_3(CH_2)_5CH_2OH$, the amount of the diether formed was quite small and corresponded to a yield of less than 1%.

In the manner of the foregoing examples, the various other aliphatic and aromatic ethers as defined in the general equation above can be prepared by the method as described herein by employing the p-toluene sulfonic acid mono- or polyesters of the corresponding aliphatic, haloaliphatic, aromatic and haloaromatic alcohols, phenols and halophenols. The method is applicable to the preparation of either the simple or the mixed ethers and to the etherification of mixtures of the aforedefined polyfluoroalkanols. The ethers are described and claimed in copending application Serial No. 402,607, filed jointly by W. A. Zisman and myself on January 6, 1954.

Since various changes and modifications may be made in the practice of the invention described herein without departing from the spirit and scope thereof, it is to be understood that only such limitations are to be imposed thereon as are required by the prior art and the appended claims.

The invention described herein may be manufactured and used by or for the Government of the United States of America for governmental purposes without the payment of any royalties thereon or therefor.

What I claim is:

1. A method of etherifying a polyfluoroalkanol of the general formula:

$$H(CF_2)_n(CH_2)_xOH$$

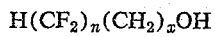

wherein $n$ is an integer from 2 to 20 and $x$ is an integer from 1 to 3 which comprises reacting the polyfluoroalkanol with aqueous alkali metal hydroxide, adding an ester selected from the group consisting of the p-toluene sulfonic acid hydrocarbon and halohydrocarbon esters and heating the mixture to form the fluoroether.

2. A method as defined in claim 1, wherein the alkali metal hydroxide is sodium hydroxide.

3. A method of alkylating a polyfluoroalkanol of the general formula:

$$H(CF_2)_n(CH_2)_xOH$$

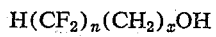

wherein $n$ is an integer from 2 to 20 and $x$ is an integer from 1 to 3 which comprises reacting the polyfluoroalkanol with aqueous sodium hydroxide, adding a p-toluene sulfonic acid aliphatic hydrocarbon ester and heating the mixture to form the fluoroether.

References Cited in the file of this patent

UNITED STATES PATENTS 2,433,844    Hanford _____ Jan. 6, 1948

OTHER REFERENCES

Fieser and Fieser: Organic Chemistry (1950), 2nd ed., p. 138.

Henne et al.: J. A. C. S. (1950), vol. 72, pp. 4378, 4379, 4380.

Shirley et al.: J. A. C. S. (1951), vol. 73, p. 458.

Cook, J. W.: Progress in Organic Chemistry (1953), No. 2, p. 60.

Shirley et al.: Jour. Organic Chem., vol. 18, pp. 378–381 (April 1953; 4 pages).